(12) United States Patent
Ravizza et al.

(10) Patent No.: US 11,379,598 B2
(45) Date of Patent: Jul. 5, 2022

(54) KNOWLEDGE GRAPH ACCESS LIMITATION BY DISCOVERY RESTRICTIONS

(71) Applicant: INTERNATIONAL BUSINESS MACHINES CORPORATION, Armonk, NY (US)

(72) Inventors: Stefan Ravizza, Wallisellen (CH); Erik Rueger, Ockenheim (DE); Tim U. Scheideler, Schoenenberg (CH); Peter Minig, Alsheim (DE)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 15/907,549

(22) Filed: Feb. 28, 2018

(65) Prior Publication Data

US 2019/0266341 A1  Aug. 29, 2019

(51) Int. Cl.
  *G06F 16/90* (2019.01)
  *G06F 21/62* (2013.01)
  *G06F 16/901* (2019.01)

(52) U.S. Cl.
  CPC ...... *G06F 21/6218* (2013.01); *G06F 16/9024* (2019.01)

(58) Field of Classification Search
  CPC .... G06F 21/6218; G06F 16/9024; G06N 5/02
  See application file for complete search history.

(56) References Cited

U.S. PATENT DOCUMENTS

| | | | |
|---|---|---|---|
| 8,214,883 B2* | 7/2012 | Obasanjo | H04L 63/102 726/4 |
| 8,256,010 B2* | 8/2012 | Orlov | G06F 21/6218 726/27 |
| 2011/0035797 A1* | 2/2011 | Slowik | G03G 15/502 726/17 |
| 2013/0318025 A1 | 11/2013 | Alemzadeh et al. | |
| 2015/0019714 A1* | 1/2015 | Shaashua | H04L 12/2818 709/224 |

(Continued)

FOREIGN PATENT DOCUMENTS

| | | |
|---|---|---|
| CN | 110209833 A | 9/2019 |
| WO | 2017100970 A1 | 6/2017 |

OTHER PUBLICATIONS

Herothemes, "Restricting Access to the Knowledge Base," Knowledge Base, https://herothemes.com/support/knowledge-base/restricting-access-knowledge-base/, Printed on Oct. 17, 2017, pp. 1-5.

(Continued)

*Primary Examiner* — Alicia M Willoughby
(74) *Attorney, Agent, or Firm* — David Spalding (57) ABSTRACT

A method and a related system for controlling user access to a target node in a knowledge graph may be provided. The method comprises defining a knowledge graph structure limitation for a user, defining a node type depending on the number of edges connecting to the node, determining a condition for an access to the target node, based on the knowledge graph structure limitation relative to the start node and the node type of the target node, upon the user attempting, coming from a start node, to access the target node in the knowledge graph, and granting access to the target node based on the determination.

11 Claims, 11 Drawing Sheets

(56) References Cited

U.S. PATENT DOCUMENTS

| | | | |
|---|---|---|---|
| 2015/0135261 A1* | 5/2015 | Park | H04L 63/102 |
| | | | 726/1 |
| 2016/0203327 A1* | 7/2016 | Akkiraju | G06F 21/6218 |
| | | | 707/785 |
| 2016/0292304 A1* | 10/2016 | Kartha | G06N 5/027 |
| 2016/0350307 A1 | 12/2016 | VerWeyst et al. | |
| 2016/0352743 A1 | 12/2016 | VerWeyst et al. | |
| 2016/0371288 A1 | 12/2016 | Le Biannic et al. | |
| 2016/0371395 A1 | 12/2016 | Dumant et al. | |
| 2016/0373423 A1 | 12/2016 | Naibo | |
| 2016/0373456 A1 | 12/2016 | Vermeulen et al. | |
| 2017/0024375 A1 | 1/2017 | Hakkani-Tur et al. | |
| 2018/0247073 A1* | 8/2018 | Kreutzer | G06F 16/9535 |
| 2018/0336364 A1* | 11/2018 | Haila | G06F 21/6227 |

OTHER PUBLICATIONS

Masuch, "HACK: Enterprise Knowledge Graph—One Graph to Connect Them All," Management Innovation eXchange, http://www.mixprize.org/hack/enterprise-knowledge-graph-one-graph-connect-them-all?challenge=19296, Printed on Oct. 17, 2017, pp. 1-7.

* cited by examiner

100

```
┌─────────────────────────────────────────────────────┐
│ 102   defining a knowledge graph structure limitation│
└─────────────────────────────────────────────────────┘
                          │
                          ▼
         ┌─────────────────────────────────┐
         │ 104   defining a node type       │
         └─────────────────────────────────┘
                          │
                          ▼
┌─────────────────────────────────────────────────────┐
│ 106   determining a condition                        │
│       for an access to the target node               │
│       reflecting the limitation and the node type    │
└─────────────────────────────────────────────────────┘
                          │
                          ▼
         ┌─────────────────────────────────────┐
         │ 108   granting access to the target  │
         │       node based on the determination│
         └─────────────────────────────────────┘
```

KNOWLEDGE GRAPH ACCESS LIMITATION BY DISCOVERY RESTRICTIONS

FIELD OF THE INVENTION

The invention relates generally to a method for managing an access to a node in a knowledge graph, and more specifically, to controlling user access to a target node in a knowledge graph based on the structure of the knowledge graph. The invention relates further to a system for controlling user access to a target node in a knowledge graph, a computing system, and a computer program product.

BACKGROUND

The management of large amounts of data, especially unstructured data, continues to be a challenge for enterprises. It continues to be difficult to store and manage expert knowledge that allows for quick and reliable access. The inequality of traditional solutions such as relational database management systems for processing highly and dynamically connected data has became obvious. Lately, cognitive computing knowledge graphs, or graph databases, have been used to store, retrieve, and process information. A knowledge graph consists of facts, which may be collected from various sources inside and outside of the enterprises, and which may be stored in the nodes of a mesh of the knowledge graph. The nodes are typically connected via edges, also known as links, representing the relationship between individual nodes. These knowledge graphs are able to handle up two billions of nodes and relationships in a single machine.

A crucial success factor for the usability of the knowledge graph by a larger number of users is to manage access rights to different nodes of the knowledge graph. Different types of users may exist having different access rights but also different needs to access the content of the knowledge graph. In parallel, commercial considerations may also play a role in restricting access to individual nodes. One solution to this dilemma may be to maintain a plurality of knowledge graphs relating to different sets of users. However, this may be a management intensive undertaking. An alternative solution may be to use access control lists (ACL) for the nodes. This approach is also management intensive because every user/node combination must be thought about in advance and the content of the access control lists have to be edited manually.

SUMMARY

According to one aspect of the present invention, a method for controlling user access to a target node in a knowledge graph may be provided. The method may comprise defining a knowledge graph structure limitation for a user, defining a node type depending on the number of edges connecting to the node, determining a condition for an access to the target node, based on the knowledge graph structure limitation relative to the start node and the node type of the target node, upon the user attempting, coming from a start node, to access the target node in the knowledge graph, and granting access to the target node based on the determination.

According to another aspect of the present invention, a system for controlling user access to a target node in a knowledge graph may be provided. The system may comprise a first definition unit adapted for defining a knowledge graph structure limitation for a user, a second definition unit adapted for defining a node type depending on the number of edges connecting to the node, a determination module adapted for determining a condition for an access to the target node, based on the knowledge graph structure limitation relative to the start node and the node type of the target node, upon the user attempting, coming from a start node, to access the target node in the knowledge graph, and a granting module adapted for granting access to the target node based on the determination.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matter. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term "controlling user access" may denote a way to allow an access to a node in a knowledge graph. Typically, access control lists may have to be maintained to grant or deny an access of the user to a node in a knowledge graph. In the described concept, the controlling of the user access may be managed only based on the structure of the knowledge graph.

The term "target node" may denote a node to be accessed in a knowledge graph. The target node typically marks an endpoint of a path through the knowledge graph along any edge/node combinations.

The term "knowledge graph" may denote a networked data structure comprising facts, represented in nodes, and edges representing connections or links between the nodes. Thus, the knowledge graph may represent a knowledge base for an organization of so-called unstructured data, i.e., facts, and their semantic relationships. Knowledge graphs are often used by search engines.

The term "knowledge graph structure limitation" may denote a rule to be reflected when accessing nodes along the path starting from a start node. The next node on a path may be accessible or not, depending on the defined knowledge graph structure limitation. Examples of knowledge graph structure limitations are step sizes and a distance function and/or node type.

The term "node type" may denote a node and the number of edges connected to the node. A node type 2 may denote a node having two edges. A node type 3 may denote a node having three edges, etc.

The term "start node" may denote a dedicated node, or a plurality, from which a crawling through the knowledge graph starts. Several start nodes may exist in a knowledge graph. This may depend on the organization of the knowledge graph, a query against the knowledge graph or it may be topic related.

The term "step size" may denote which next node to be accessed starting from a start node. The start node may always be the first node on a path through the knowledge graph. Depending on the step size, an access to the next node (the neighboring node) may be decided dynamically based on the step size.

The term "radius" may denote the maximum sphere around a start node in which nodes are accessible in the knowledge graph. The radius may be related to a distance function between nodes. One example of a distance function may be implemented using weights (i.e., weight factors) for the edges. In this case, an accumulated inverse weight sum may be used to determine a distance from the start node.

The proposed method for controlling user access to a target node in a knowledge graph may offer multiple advantages and technical effects:

The proposed concept does not base its access right structure on a dedicated user and/or role versus node mapping concept, as known as, access control lists. In contrast, access to a node is solely granted on the basis of the structure of the knowledge graph and rules in the form of a step size and a number of edges for nodes to fall under the step size rule. Instead of the step size, also a radius, together with a distance function between the nodes, may be used as a knowledge graph structure limitation. Thus, the access to a node may change dynamically with the structure of the knowledge graph.

Hence, no operator has to take the burden of managing access control lists. This may be important for fast and significantly changing knowledge graphs. It may also represent a tool to restrict access to nodes by a user's type of role. Certain user groups may only have access to a limited information density of the knowledge graph. This may be far less than the knowledge graph would be able to deliver. This way, a try and buy concept may be implemented: a user may have access to a limited number of nodes, e.g., step size 4, and after a commercial transaction. He may also be allowed to access nodes in between. The reduction of the step size may also be coupled to a membership in a special group, e.g., a company, a partner network, and so on.

In the following, additional embodiments of the method, which are also applicable to the related system, will be described:

According to one preferred embodiment of the method, the knowledge graph structure limitation may be a step size for accessing nodes on a path to the target node starting from the start node. Thus, for example, only every second node may be accessed on a path through the knowledge graph. However, the step size may have other values. If the step size may be predefined as "3", only every third node may be accessed on a path through the knowledge graph. For example, only the content of each third node may be used for determining which path to follow through the knowledge graph. Additional decision criteria for accessing a node may be applied, for example, the number of edges of the node, the content of the node or additional access right mechanisms (e.g., access control lists).

According to another preferred embodiment of the method, the knowledge graph structure limitation may be a radius around the start node. This alternative way of setting the knowledge graph structure limitation also reflects the structure of the knowledge graph without relying on any access control lists or other more complex access granting mechanisms. Basically, all nodes that may lie on (not in) the circle line may become visible for a user. The distance between the nodes may be defined by a distance function (via weights to the edges) so that some nodes may lie on the circle line and other nodes not, even if they are the same number of edge/node connections away from the start node.

Around a node being touched, the circle may again have its own circle around it touching other nodes, and so on.

According to one advantageous embodiment of the method, the radius may be a predefined maximum number of edge/node combinations—in particular, a number of edge/node combinations along a path directed away from a start node.

According to another advantageous embodiment of the method, the radius may be based on a distance function along a path from the start node to the target node. The distance function may be based on edge weights. In particular, an accumulated inverse weight along the path through the knowledge graph may be used as a distance. If the maximum distances have been reached, no more additional nodes outside such a defined area will be accessed. In comparison to the embodiment described before, one may say that in the embodiment before, the weight for each edge may always have the value "1".

According to one optional embodiment of the method, the knowledge graph may have a plurality of start nodes. Consequently, depending on the start node, the access right structure changes. The start node may be determined outside the scope of the here described concept. For example, different search algorithms or search inquiries may be used to determine an appropriate start node in case a search engine is used.

According to an additional advantageous embodiment of the method, the only nodes having a node type with a number of edges below a predefined edge number are eligible for being stepped over. This means that the rule of applying a step size may only be applied to those nodes having a comparably low number of edges. Typically, only nodes having two edges may be stepped over. However, as another example, nodes having three edges may also be stepped over and only those nodes having four or more edges will typically be accessed on a path through the knowledge graph. As a rule of thumb one may say that a node having a large number of edges to other nodes may influence the meaning and the content of that special area of the knowledge graph more intensively than those nodes only having a low number (e.g., 1 or 2 edges). The granularity, by which access to nodes may be allowed, is tunable by the step size in combination with the definition of the minimum number of edges required to always access a node on a path through the knowledge graph.

According to one additionally preferred embodiment, the method may comprise performing a node type determination, dynamically, at every access attempt on a path from the start node to the target node. This may guarantee that an access to a node with a comparably large number of edges is always performed. Thus, no predetermined path through the knowledge graph may be followed and no sub-graphs only depending on one interlink node may be excluded automatically because the interlink node may accidentally be stepped over. This mechanism may also guarantee an always actual behavior of the method, even if changes have been made to the knowledge graph, for example, in the form of new nodes on new edges or new waves of the edges of new content of the nodes.

According to a further optional embodiment, the method may also comprise changing the step size dynamically depending on a user attribute. Generally, having a lower step size allows for a more granular access to nodes of the knowledge graph. A skilled user may understand detail facts stored in nodes that may otherwise be stepped over. Thus, for one user, a step size of "1", meaning that every node will be reflected on a path through the knowledge graph, because he will need and be able to digest the full information of the knowledge graph. For another user, such in-depth information may be overwhelming and consequently the step size for him may be increased to "2", "3" or an even higher number. Alternatively, a radius around the start node may be determined. A skilled person may be allowed an access to nodes with a comparably large radius around two start nodes, wherein for a non-skilled person the radius would be limited.

Additionally, the access parameters, in particular the radius or the step size, may be set according to contractual agreements, to positions in a community (like a company, a customer or supplier status), or payments made to the owner of the knowledge graph.

In the following, a detailed description of the figures will be given. All instructions in the figures are schematic. Firstly, a block diagram of an embodiment of the inventive method for controlling user access to a target node in a knowledge graph is given. Afterwards, further embodiments, as well as embodiments of the system for controlling user access to a target node in a knowledge graph, will be described.

Figure 1:
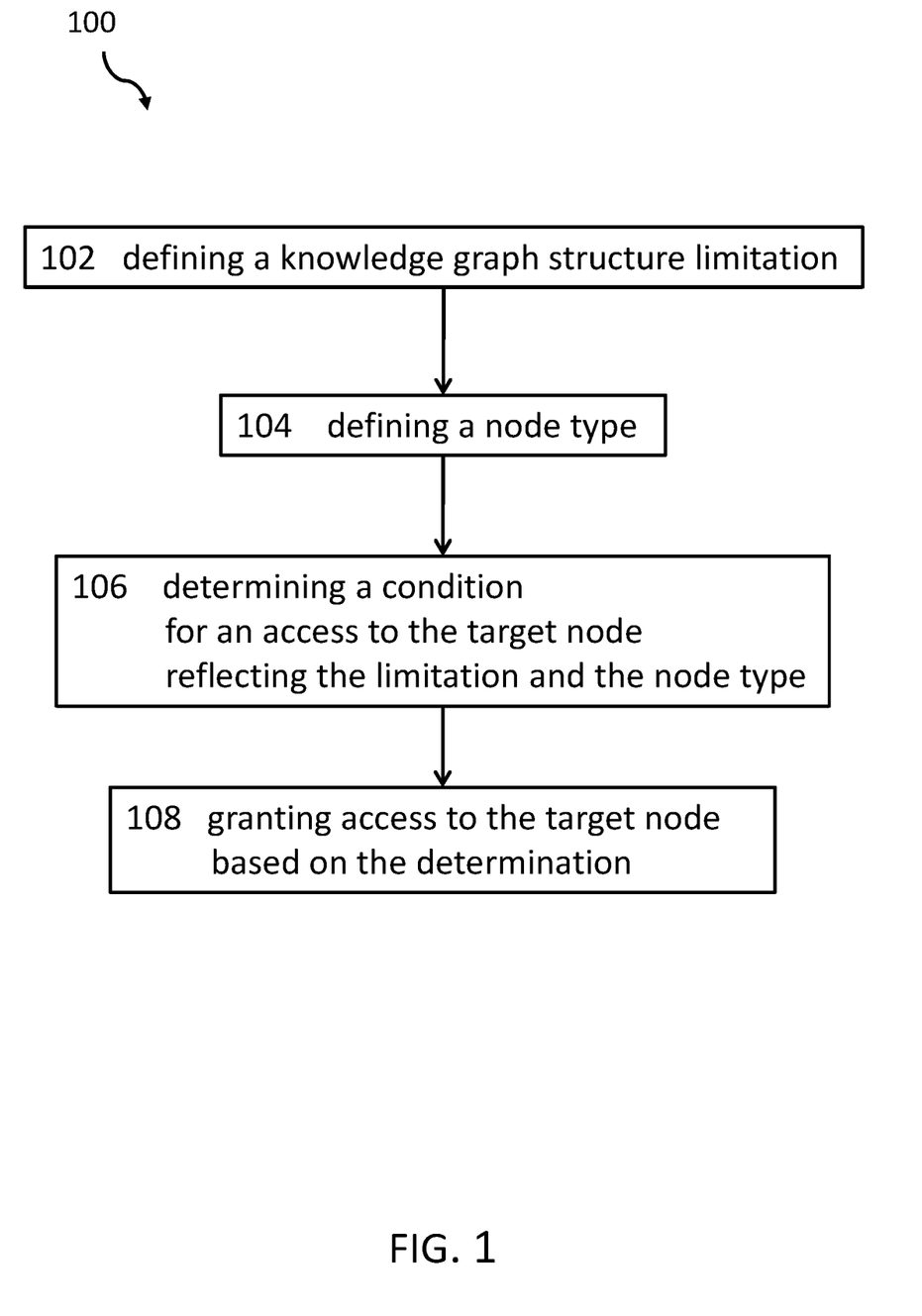
FIG. 1 shows a block diagram of an embodiment of the inventive method for controlling user access to a target node in a knowledge graph.

FIG. 1 shows a block diagram of an embodiment of the method 100 for controlling user access to a target node in a knowledge graph. The method 100 comprises defining a knowledge graph structure limitation for a user (step 102). The limitation may take several forms but relies on the structure of the organization of the knowledge graph.

The method 100 comprises further defining a node type depending on the number of edges connecting to the node, for example, basically a link or connection count is used here (step 104).

Additionally, the method 100 comprises upon the user attempting, coming from a start node, to access the target node in the knowledge graph, determining a condition for an access to the target node, based on the knowledge graph structure limitation relative to the start node and the node type of the target node (step 106), and granting access to the target node based on the determination (step 108). For example, at least two conditions have to be met before an access can be made to a node by a user on a path to a target node starting from the start node. Because the target node may not be known when starting a path through the knowledge graph, the determination, whether an access to an intermediate node is made to decide which edge should be followed from the intermediate to a next node, is made for every node on the path.

Figure 2:
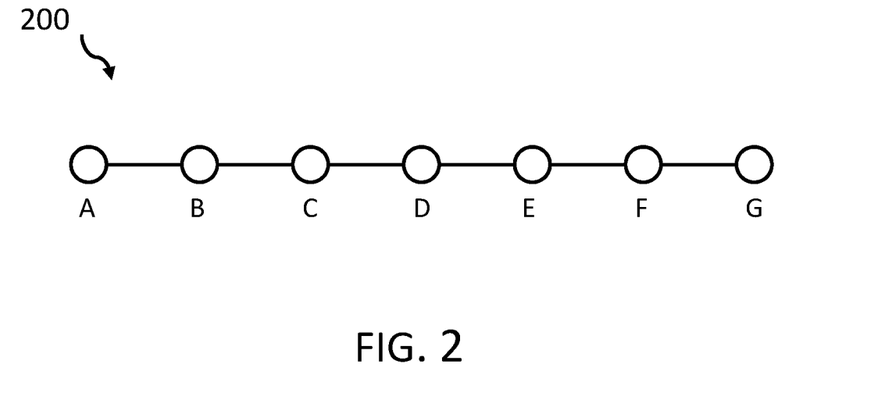
FIG. 2 shows a block diagram of an embodiment of a linear chain of nodes.

FIG. 2 shows a block diagram 200 of an embodiment of a linear chain of nodes A, B, C, D, E, F, G. The lines between the nodes represent the edges of links. It may be noted that a typical knowledge graph has far more nodes and edges. This figure may only be used for introductory matters.

Figure 3:
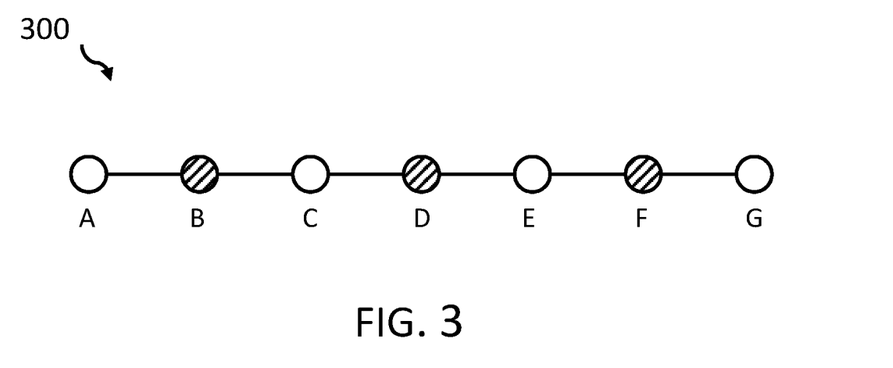
FIG. 3 shows a block diagram of an embodiment of the linear chain of nodes with access to every second node.

FIG. 3 shows a block diagram 300 of an embodiment of the linear chain of nodes A, B, C, D, E, F, G with access to every second node. Thus, the step size may be set to "2". Node A is a start node. Starting from here, nodes C, E, and G may be accessed. Nodes B, D, F may not be accessible at all. They are marked as diagonal striped circles.

Figure 4:
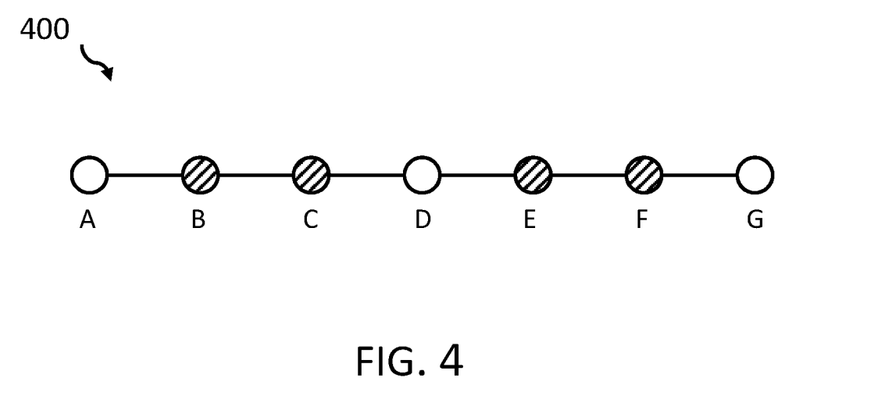
FIG. 4 shows a block diagram of an embodiment of the linear chain of nodes with access to every third node.

FIG. 4 shows a block diagram of an embodiment of the linear chain 400 of nodes with access to every third node. Hence, an access to the start node A and the subsequent nodes D and G is possible.

Figure 5:
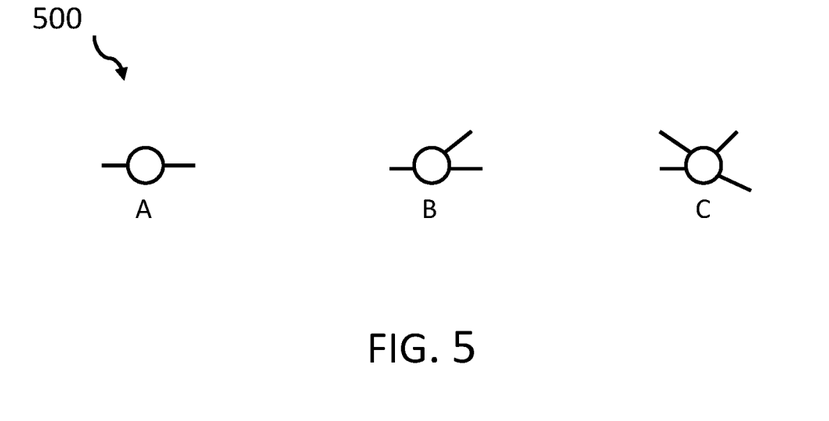
FIG. 5 shows a block diagram of an example of a node with 2, 3, and 4 edges.

FIG. 5 shows block diagrams of examples of a node with 2, 3, and 4 edges for completeness reasons. It may be understood that the node may have many more edges to other nodes than only one.

Figure 6:
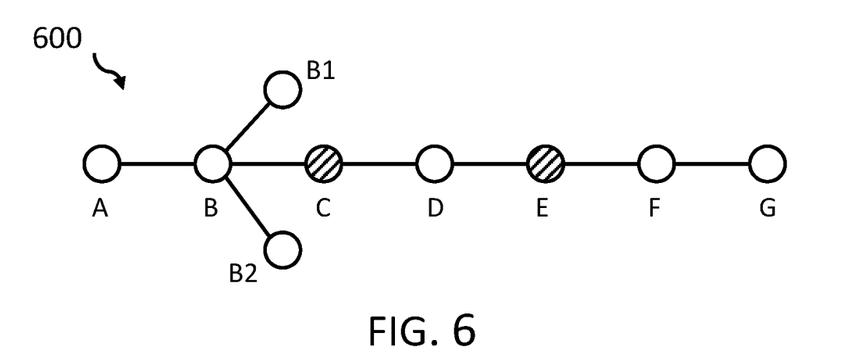
FIG. 6 shows a block diagram of an embodiment of a group of nodes with step size 2 and access to the node with 4 links.

FIG. 6 shows a block diagram of an embodiment of a group 600 of nodes with step size 2 and access to the node with 4 links. This figure combines the concept of the step size and the number of edges of a node. Here, node B has four edges: to the nodes A, B1, B2, and C. However, the minimum edge number at which the step size rule may be reflected, is not reached. Therefore, node B may not be stepped over, so that the node will be visible even if a step size "2" is used.

Figure 7:
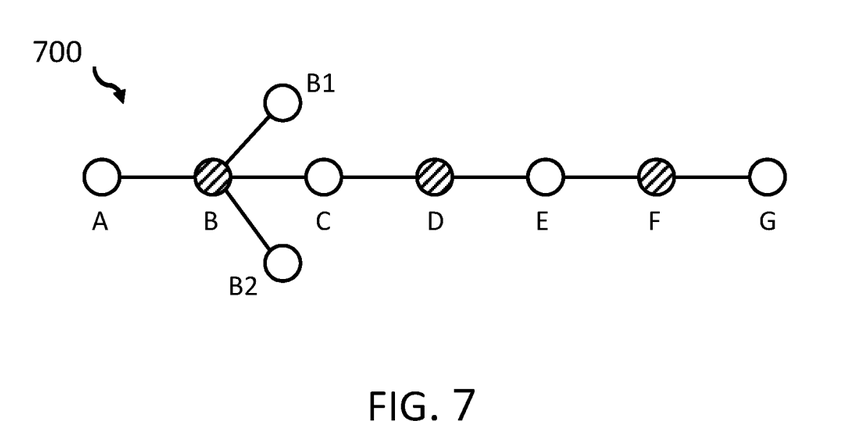
FIG. 7 shows a block diagram of an embodiment of a group of nodes with step size 2 and no access to the node with 4 links.

FIG. 7 shows a block diagram of an embodiment of a group 700 of nodes with step size 2 and no access to the node with 4 links. This is in contrast to the example of FIG. 6.

Now, the number of required edges of a node, here node B, is set in such a way that the step size is also reflected at node B. Thus, subtrees, depending on B1 and B2, may not be reachable from the start node A. It becomes also clear that, depending on the combination of the step size and the number of edges to be reflected, the visible knowledge graph (i.e., the visible nodes) is different.

Figure 8:
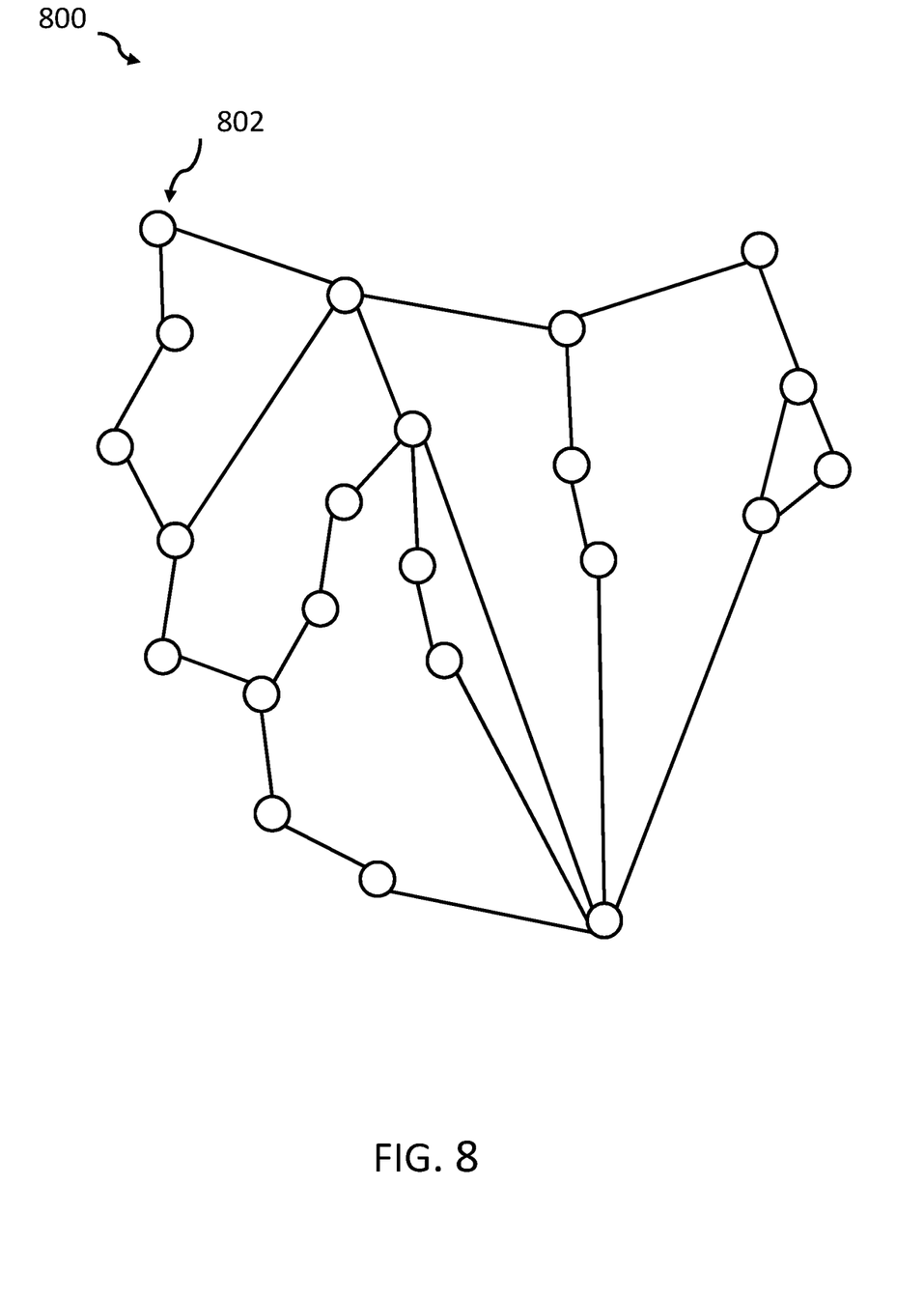
FIG. 8 shows a block diagram of an embodiment of a knowledge graph with no access restrictions.

FIG. 8 shows a block diagram of an embodiment of a knowledge graph 800 with no access restrictions. This exemplary structure for a portion of a more complex knowledge graph may serve as the basis for the following figures. Node 802 represents the start node.

Figure 9:
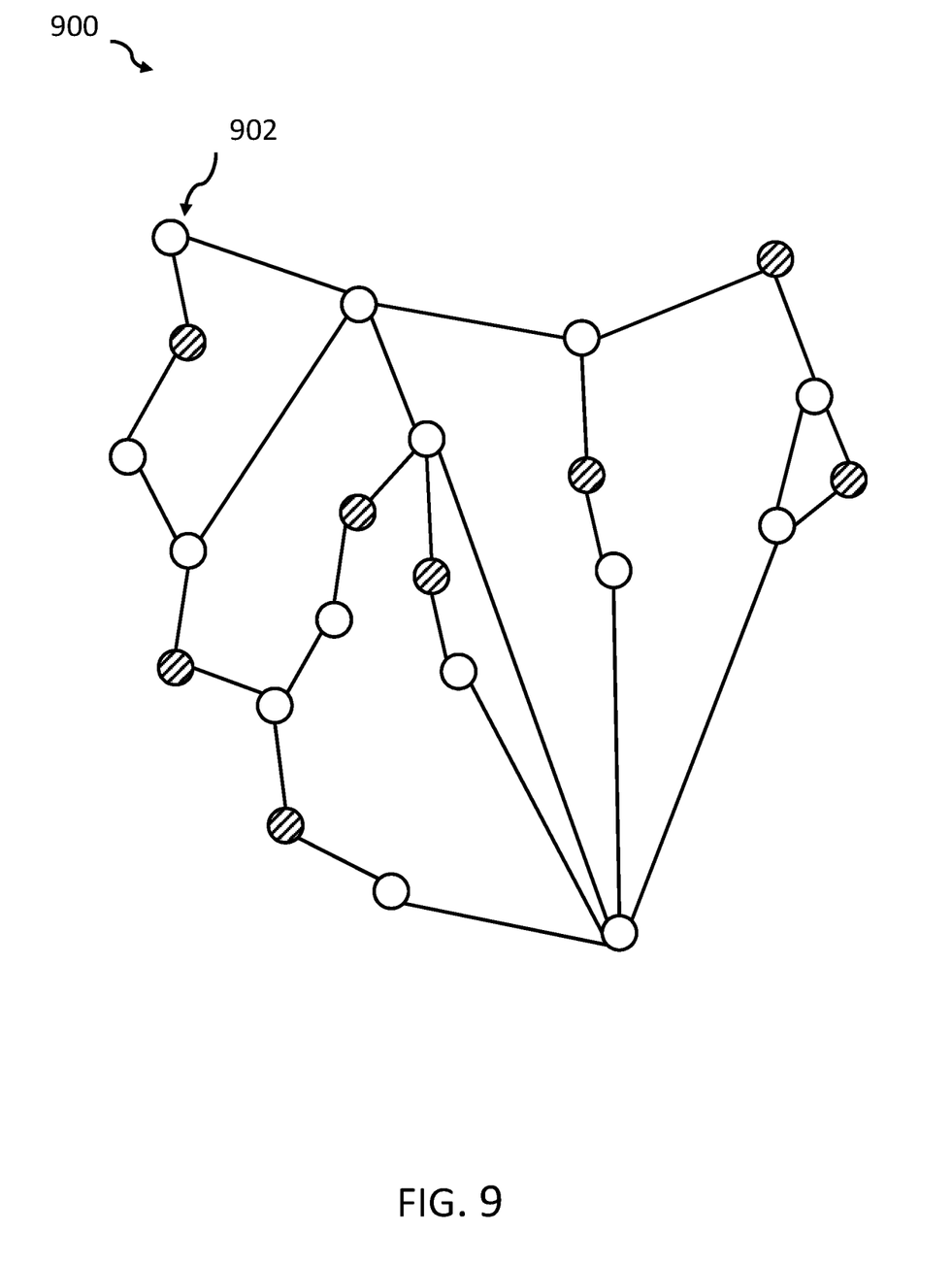
FIG. 9 shows a block diagram of an embodiment of a knowledge graph with access restrictions.

FIG. 9 shows a block diagram of an embodiment of a knowledge graph 900 with access restrictions. Node 902 represents the start node. Here, a step size of "2" is implemented. Non-accessible nodes are again symbolized by diagonally striped circles. It may also be noted that nodes with more than two edges do not underlie the two-step rule. Thus, these nodes may be assumed to be a more important node, because of the number of edges, and thus are always visible.

Figure 10:
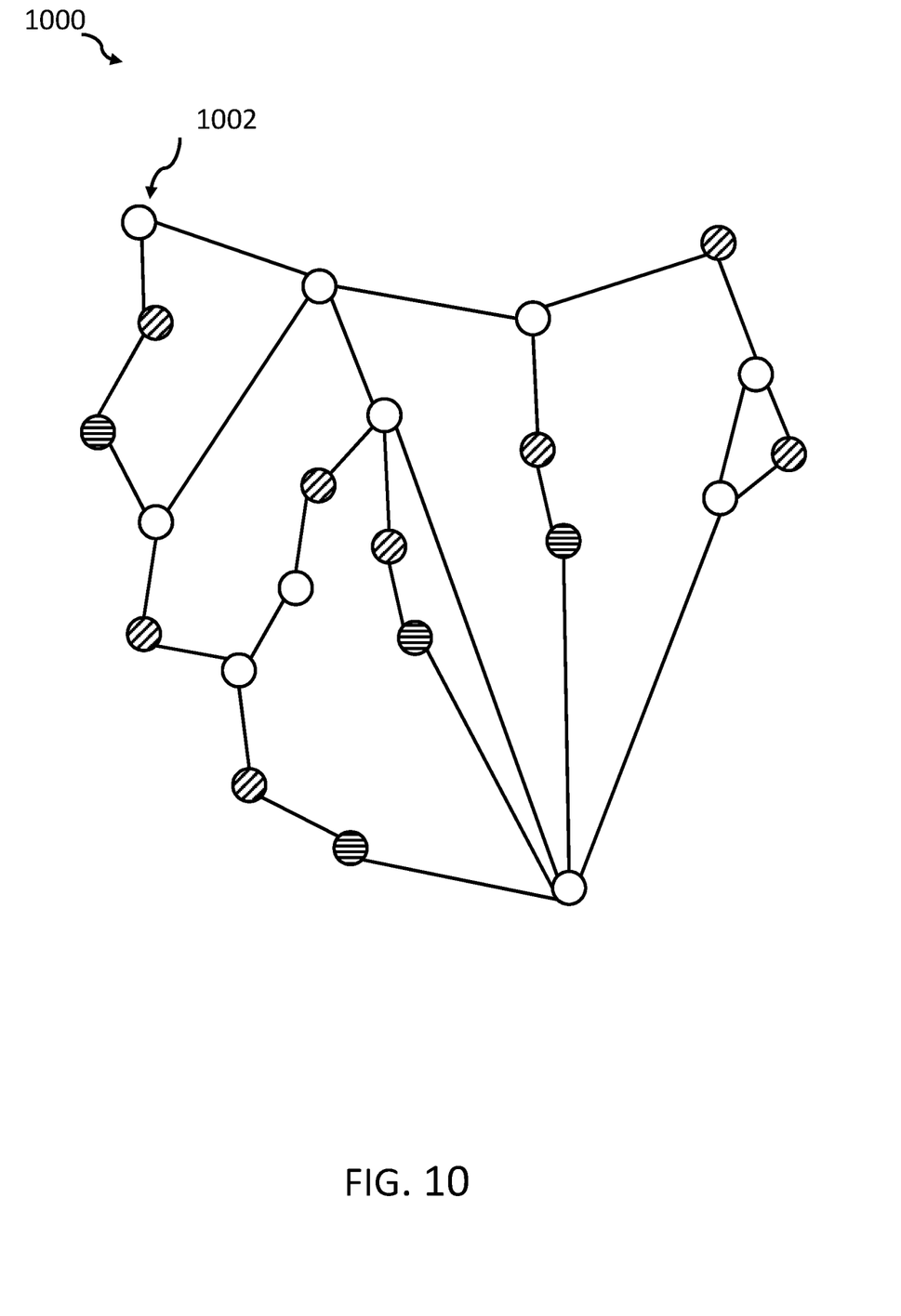
FIG. 10 shows a block diagram of an embodiment of a knowledge graph with other access restrictions.

FIG. 10 shows a block diagram of an embodiment of a knowledge graph 1000 with other access restrictions. Node 1002 represents the start node. In this case, a step size "3" is implemented. The nodes, which are additionally not visible if compared to FIG. 9, are marked with horizontal stripes. Also here, nodes with three and more edges are always accessible. Only nodes with two edges are considered the step size of "3".

Figure 11:
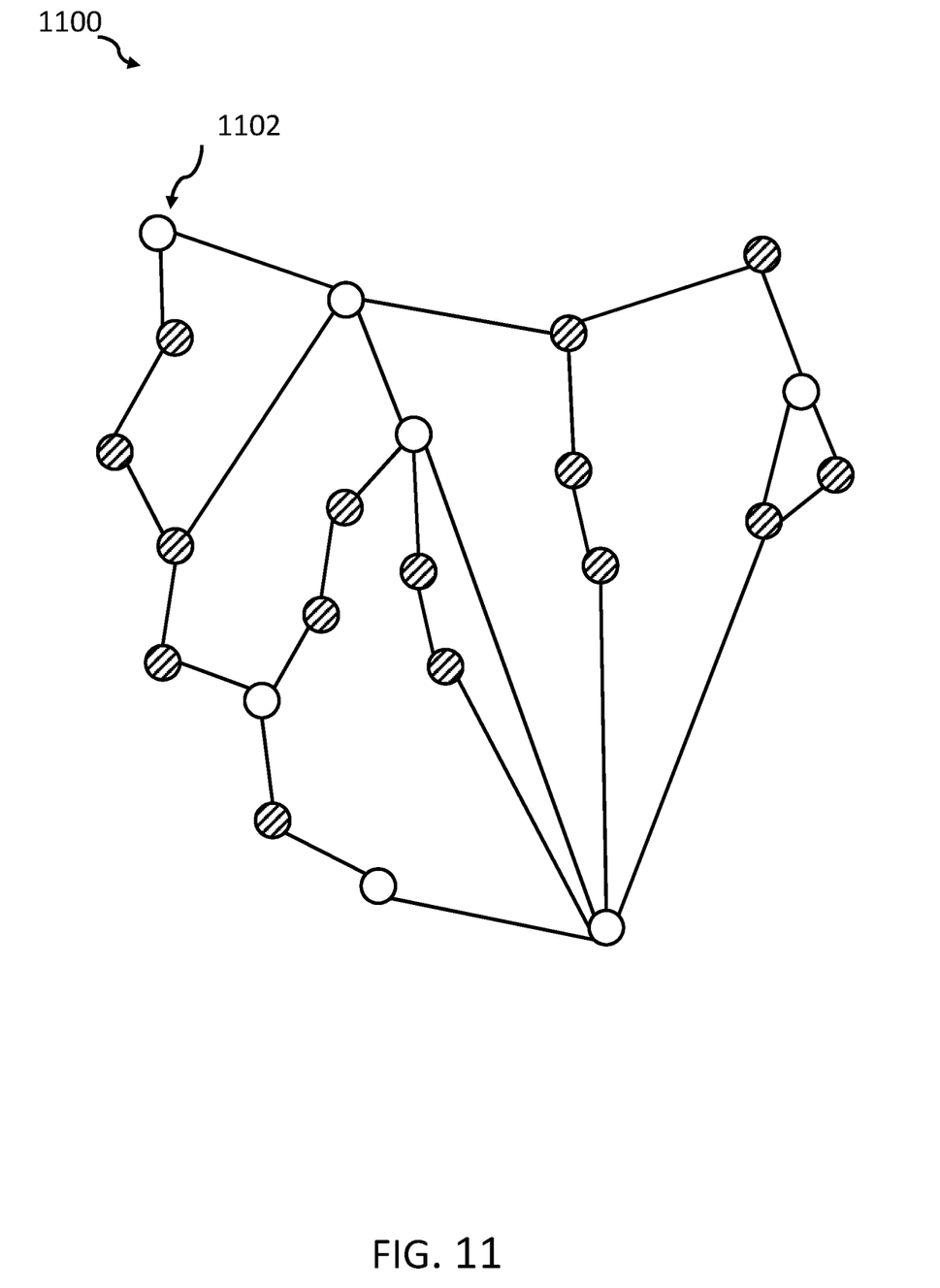
FIG. 11 shows a block diagram of an embodiment of a knowledge graph with other additional access restrictions.

FIG. 11 shows a block diagram of an embodiment of a knowledge graph 1100 with again other access restrictions. In this case, nodes having three edges are also excluded from visibility, (i.e., accessibility). One example may be the third node going horizontally to the right from the start node 1102.

Figure 12:
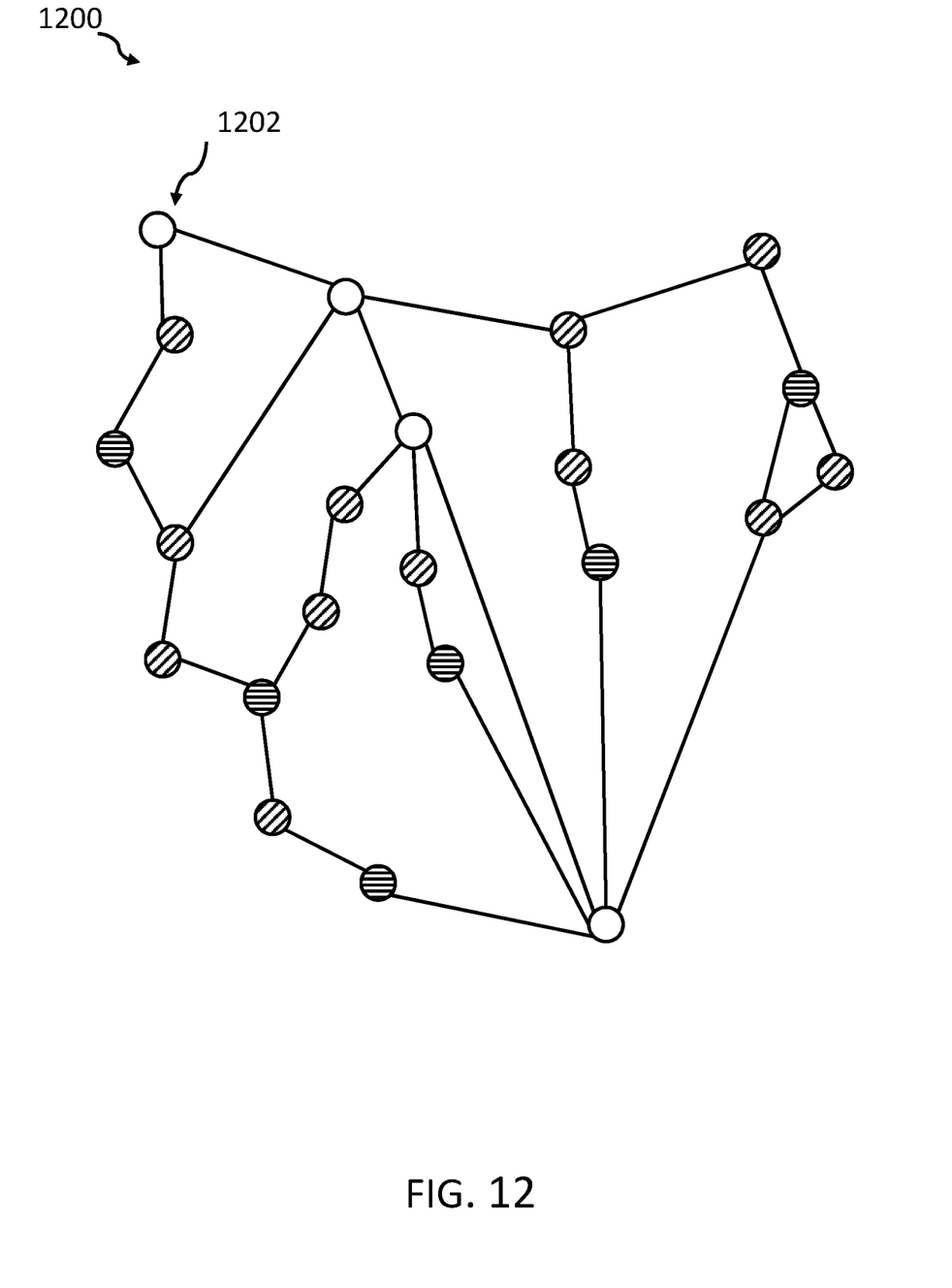
FIG. 12 shows a block diagram of an embodiment of a knowledge graph with a further version of access restrictions.

FIG. 12 shows a block diagram of an embodiment of a knowledge graph 1200 with a further version of access restrictions. Again, starting from the start node 1202, only those nodes are visible having more than three edges; and at the same time the step size is set to "3".

Again, it has been shown that depending on the parameters, for example, step size and number of edges, the visible part of the knowledge graph varies. It may also be noted that no access control list is required because the roads to access individual nodes in the knowledge graph are strictly derived from the structure of the knowledge graph.

Figure 13:
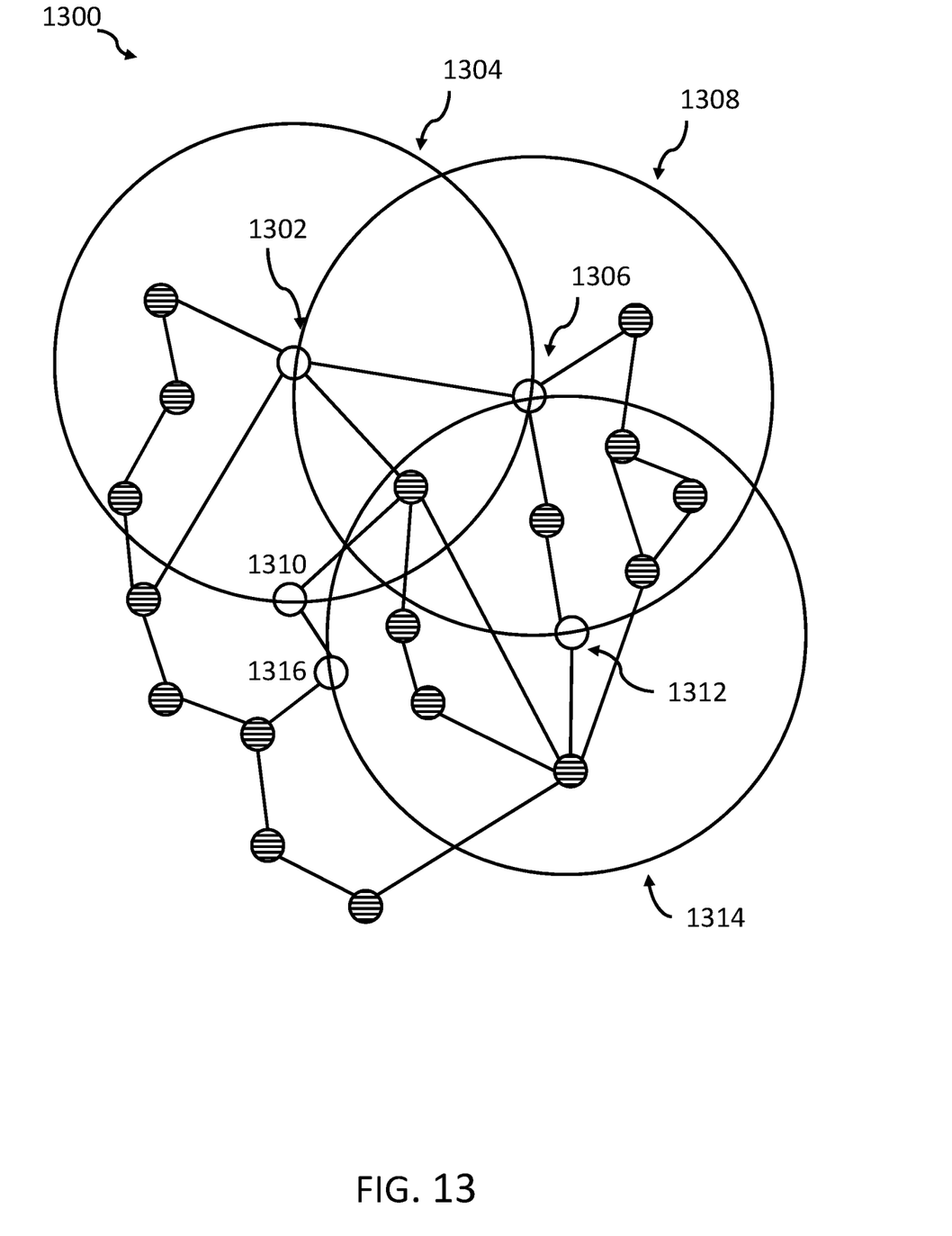
FIG. 13 shows a block diagram of an embodiment of a knowledge graph with distance based access restrictions.

FIG. 13 shows a block diagram of an embodiment of a knowledge graph 1300 with distance based access restrictions. In this embodiment, a circle 1304 is imagined around the start node 1302. In case the knowledge graph is thought to be a three-dimensional structure, which may also work well, then an imagined sphere may be used instead of the radius. Again in 2D, the radius of the circle defines those nodes being visible when starting from a start node, here node 1302. In particular, the radius-like step size works similar to the linear step size. Those nodes being touched by the circle line 1304 will also become visible. These touched nodes are actually node 1306 and 1310.

Around node 1306, another circle 1308 is drawn. And again, nodes being touched by this circle 1308 will become visible. This condition becomes valid for node 1312. Again, around node 1312 another circle, 1314 is drawn. And again, in a subsequent step, it is again observed or determined which further node will be touched by the circle line 1314. In this case it is node 1316.

It may also be noted that note 1310 is touched by circle 1304 around start node 1302. However, for reasons of comprehensibility, the circles around the nodes 1310 and 1316 have not been drawn anymore. However, in general, around each node that is touched, another circle is drawn, and it is determined which additional nodes will be touched. This concept continues throughout the whole knowledge graph 1300 or a predefined portion of the knowledge graph.

It may be mentioned that a plurality of start nodes may exist in a knowledge graph. The start nodes may be knowledge topic related query related.

Figure 14:
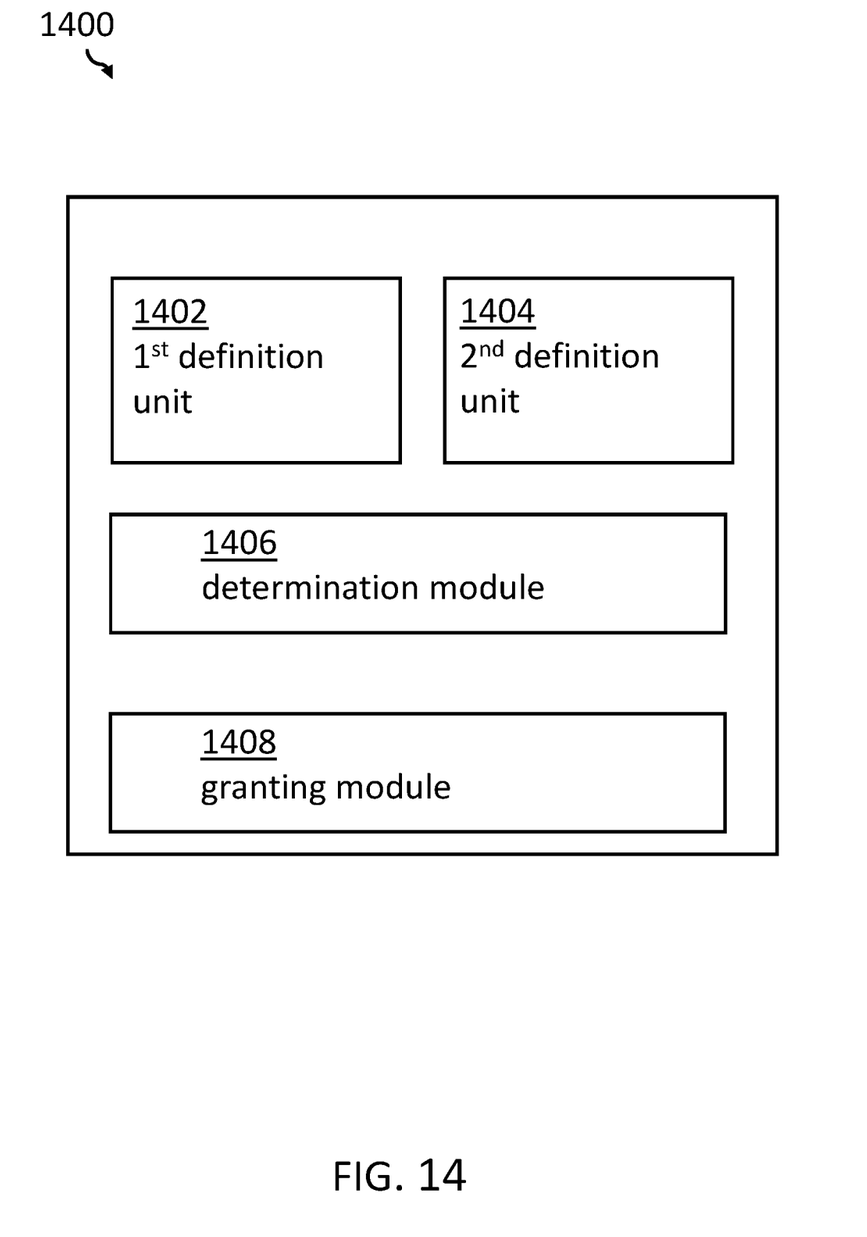
FIG. 14 shows a block diagram of an embodiment of the inventive system for controlling user access to a target node in a knowledge graph.

FIG. 14 shows a block diagram of an embodiment of the inventive system 1400 for controlling user access to a target node in a knowledge graph. The system comprises a first definition unit 1402 adapted for defining a knowledge graph structure limitation for a user and a second definition unit 1404 adapted for defining a node type, depending on the number of edges connecting to the respective node. Furthermore, the system 1400 comprises a determination module 1406 adapted for determining a condition for an access to a target node, based on a knowledge graph structure limitation relative to the start node and the node type of the target node, and upon the user attempting, coming from a start node, to access the target node in the knowledge graph, and a granting module 1408 adapted for granting access to the target node based on the determination.

Figure 15:
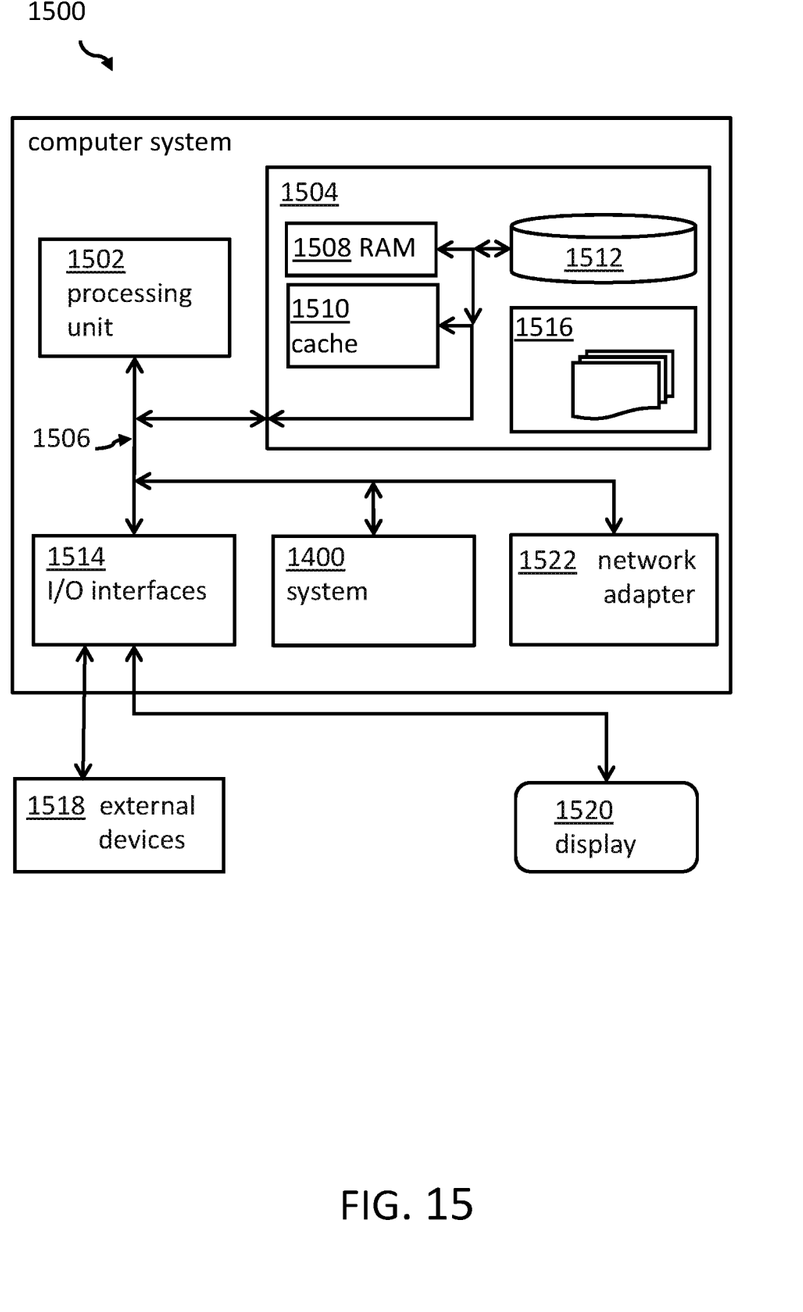
FIG. 15 shows a block diagram of an embodiment of a computer system comprising the system according to FIG. 14.

Embodiments of the invention may be implemented together with virtually any type of computer, regardless of the platform being suitable for storing and/or executing program code. FIG. 15 shows, as an example, a computing system 1500 suitable for executing program code related to the proposed method.

The computing system 1500 is only one example of a suitable computer system and is not intended to suggest any limitation as to the scope of use or functionality of embodiments of the invention described herein, regardless, whether the computer system 1500 is capable of being implemented and/or performing any of the functionality set forth hereinabove. In the computer system 1500, there are components, which are operational with numerous other general purpose or special purpose computing system environments or configurations. Examples of well-known computing systems, environments, and/or configurations that may be suitable for use with computer system/server 1500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1500 may be described in the general context of computer system-executable instructions, such as program modules, being executed by a computer system 1500. Generally, program modules may include routines, programs, objects, components, logic, data structures, and so on that perform particular tasks or implement particular abstract data types. Computer system/server 1500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 1500 is shown in the form of a general-purpose computing device. The components of computer system/server 1500 may include, but are not limited to, one or more processors or processing units 1502, a system memory 1504, and a bus 1506 that couple various system components including system memory 1504 to the processor 1502. Bus 1506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1500 typically includes a variety of computer system readable media. Such media may be any available media that is accessible by computer system/server 1500, and it includes both, volatile and non-volatile media, removable and non-removable media.

The system memory 1504 may include computer system readable media in the form of volatile memory, such as random access memory (RAM) 1508 and/or cache memory 1510. Computer system/server 1500 may further include other removable/non-removable, volatile/non-volatile computer system storage media. By way of example only, a storage system 1512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1506 by one or more data media interfaces. As will be further depicted and described below, memory 1504 may include at least one program product having a set (e.g., at least one) of program modules that are configured to carry out the functions of embodiments of the invention.

The program/utility, having a set (at least one) of program modules 1516, may be stored in memory 1504 by way of example, and not limiting, as well as an operating system, one or more application programs, other program modules, and program data. Each of the operating systems, one or more application programs, other program modules, and program data or some combination thereof, may include an implementation of a networking environment. Program modules 1516 generally carry out the functions and/or methodologies of embodiments of the invention, as described herein.

The computer system/server 1500 may also communicate with one or more external devices 1518 such as a keyboard, a pointing device, a display 1520, etc.; one or more devices that enable a user to interact with computer system/server 1500; and/or any devices (e.g., network card, modem, etc.) that enable computer system/server 1500 to communicate with one or more other computing devices. Such communication can occur via Input/output (I/O) interfaces 1514. Still yet, computer system/server 1500 may communicate with one or more networks such as a local area network (LAN), a general wide area network (WAN), and/or a public network (e.g., the Internet) via network adapter 1522. As depicted, network adapter 1522 may communicate with the other components of computer system/server 1500 via bus 1506. It should be understood that although not shown, other hardware and/or software components could be used in conjunction with computer system/server 1500. Examples include, but are not limited to: microcode, device drivers, redundant processing units, and external disk drive arrays, RAID systems, tape drives, and data archival storage systems, etc.

Additionally, the system 1400 for controlling user access to a target node in a knowledge graph is attached to the bus system 1506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another devices to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for controlling user access to a target node in a knowledge graph, the method comprising:
   defining a knowledge graph structure limitation for a user, wherein the knowledge graph structure limitation is a step size for accessing one or more nodes on a path to the target node starting from a start node at a pre-defined increment of nodes equal to the step size, wherein the step size is more than one and only the nodes at the pre-defined increment from a prior node on the path to the target node are accessible to the user;
   defining a node type based on a number of edges connected to a respective node;
   determining a condition for user access to the target node, based on the knowledge graph structure limitation for the user relative to the start node and the node type of the target node, wherein the user is attempting to access the target node in the knowledge graph; and
   granting access to the target node based on the determination.

2. The method according to claim 1, wherein the knowledge graph comprises a plurality of start nodes.

3. The method according to claim 1, wherein the one or more nodes having a node type with a number of edges below a predefined edge number are eligible for being stepped over.

4. The method according to claim 1, further comprising: performing a node type determination, dynamically, at every access attempt on a path from the start node to the target node.

5. The method according to claim 1, further comprising: changing the step size, dynamically, based on a user attribute.

6. A system for controlling user access to a target node in a knowledge graph, the system comprising:
- a first definition unit for defining a knowledge graph structure limitation for a user, wherein the knowledge graph structure limitation is a step size for accessing one or more nodes on a path to the target node starting from a start node at a pre-defined increment of nodes equal to the step size, wherein the step size is more than one and only the nodes at the pre-defined increment from a prior node on the path to the target node are accessible to the user;
- a second definition unit for defining a node type based on a number of edges connected to a respective node;
- a determination module for determining a condition for access to the target node, based on the knowledge graph structure limitation for the user relative to the start node and the node type of the target node, wherein the user is attempting to access the target node in the knowledge graph; and
- a granting module adapted for granting access to the target node based on the determination.

7. The system according to claim 6, wherein the knowledge graph comprises a plurality of start nodes.

8. The system according to claim 6, wherein the one or more nodes having a node type with a number of edges below a predefined edge number are eligible for being stepped over.

9. The system according to claim 6, wherein the determination module performs a node type determination, dynamically, at every access attempt on a path from the start node to the target node.

10. The system according to claim 6, wherein the determination module changes the step size, dynamically, based on a user attribute.

11. A computer program product for controlling user access to a target node in a knowledge graph, the computer program product comprising a computer readable storage medium having program instructions embodied therewith, the program instructions being executable by one or more computing systems to cause the one or more computing systems to:
- define a knowledge graph structure limitation for a user, wherein the knowledge graph structure limitation is a step size for accessing one or more nodes on a path to the target node starting from a start node at a pre-defined increment of nodes equal to the step size, wherein the step size is more than one;
- define a node type depending on a number of edges connecting to a respective node;
- determine a condition for access to the target node, based on the knowledge graph structure limitation for the user relative to the start node and the node type of the target node, wherein the user is attempting to access the target node in the knowledge graph; and
- grant access to the target node based on the determination.

* * * * *